US009600889B2

(12) United States Patent
Boisson et al.

(10) Patent No.: US 9,600,889 B2
(45) Date of Patent: Mar. 21, 2017

(54) METHOD AND APPARATUS FOR PERFORMING DEPTH ESTIMATION

(71) Applicant: THOMSON LICENSING, Issy de Moulineaux (FR)

(72) Inventors: Guillaume Boisson, Pleumeleuc (FR); Neus Sabater, Rennes (FR); Valter Drazic, Betton (FR)

(73) Assignee: Thomson Licensing, Issy de Moulineaux (FR)

( * ) Notice: Subject to any disclaimer, the term of this patent is extended or adjusted under 35 U.S.C. 154(b) by 157 days.

(21) Appl. No.: 14/578,404

(22) Filed: Dec. 20, 2014

(65) Prior Publication Data

US 2015/0178936 A1 Jun. 25, 2015

(30) Foreign Application Priority Data

Dec. 20, 2013 (EP) ..................................... 13306806

(51) Int. Cl.
G06T 15/00 (2011.01)
G06T 7/00 (2006.01)
H04N 13/02 (2006.01)

(52) U.S. Cl.
CPC ....... *G06T 7/0075* (2013.01); *H04N 13/0271* (2013.01); *G06T 2207/10012* (2013.01); *G06T 2207/10021* (2013.01); *G06T 2207/10028* (2013.01); *G06T 2207/20016* (2013.01); *G06T 2207/20228* (2013.01)

(58) Field of Classification Search
CPC ............ H04N 13/0271; H04N 13/0022; G06T 2207/10028; G06T 2207/20016; G06T 2207/20228; G06T 7/0075–7/0077
See application file for complete search history.

(56) References Cited

U.S. PATENT DOCUMENTS

| 5,179,441 A * | 1/1993 | Anderson ................ G06K 9/32 348/43 |
| 2010/0309292 A1* | 12/2010 | Ho ....................... H04N 13/026 348/47 |
| 2012/0014590 A1 | 1/2012 | Martinez-Bauza et al. |
| 2012/0056982 A1 | 3/2012 | Katz et al. |

(Continued)

OTHER PUBLICATIONS

Bogumil Bartczak et al., "Dense Depth Maps from Low Resolution Time-of-Flight Depth and High Resolution Color Views", ISVC 2009, Part II, LNCS 5876, pp. 228-239, 2009, Springer-Verlag Berlin Heidelberg 2009.*

(Continued)

*Primary Examiner* — Brian P Werner
(74) *Attorney, Agent, or Firm* — Tutunjian & Bitetto, P.C.

(57) ABSTRACT

A method of performing depth estimation, the method comprising: estimating, at a higher spatial resolution of images, a global disparity map based on disparity between corresponding pixels of a stereo disparity map obtained from images forming a stereo image set associated with a passive depth estimation technique and an active depth map associated with an active depth estimation technique, wherein the disparity is estimated within a restricted range determined based on a disparity previously estimated between a stereo disparity map and an active depth map corresponding to a lower spatial resolution of the said images and map.

21 Claims, 7 Drawing Sheets

(56) References Cited

U.S. PATENT DOCUMENTS

2014/0147031 A1* 5/2014 Rzeszutek ............ G06T 7/0075
382/154

OTHER PUBLICATIONS

Hoff et al, "Surfaces from Stereo: Integrating Feature Matching, Disparity Estimation, and Contour Detection", IEEE Transactions on Pattern Analysis and Machine Intelligence. vol. 11. No. 2. Feb. 1989, pp. 121-136.*

Gudmundsson et al—Fusion of Stereo Vision and Time-of-Flight Imaging for Improved 3D Estimation—Int. J. Intelligent Systems Technologies and Applications, Jan. 1, 2008, pp. 1-8.

Ruhl et al: "Integrating approximate depth data into dense image correspondence estimation", Visual Media Production, Dec. 5, 2012 (Dec. 5, 2012), pp. 26-31.

Nair et al: "A Survey on Time-of-Flight Stereo Fusion", Jan. 1, 1901 (Jan. 1, 1901), pp. 105-127.

Zhu et al: "Joint depth and alpha matte optimization via fusion of stereo and time-of-flight sensor", 2009 IEEE Conference on Computer Vision and Pattern Recognition Jun, 20-25, 2009, IEEE, Jun. 20, 2009 (Jun. 20, 2009), pp. 453-460.

Laureano et al: "Disparities maps generation employing multi-resolution analysis and perceptual grouping"; 2008 First Workshops on Image Processing Theory, Tools and Applications (IPTA); Nov. 23-26, 2008; pp. 1-6.

Gandhi et al: "High-resolution depth maps based on TOF-stereo fusion"; 2012 IEEE International Conference on Robotics and Automation (ICRA); May 14-18, 2012: pp. 4742-4749.

Fischer et al: "Combination of time-of-flight depth and stereo using semiglobal optimization"; Robotics and Automation (ICRA), 2011 IEEE International Conference on May, 9-13, 2011; pp. 1-6.

Zhang et al: "High quality depth maps from stereo matching and ToF camera"; Soft Computing and Pattern Recognition (SoCPaR), 2011 International Conference; vol., no., pp. 68-72, Oct. 14-16, 2011.

Search Report Dated Apr. 22, 2014.

* cited by examiner

METHOD AND APPARATUS FOR PERFORMING DEPTH ESTIMATION

This application claims the benefit, under 35 U.S.C. §119 of European Patent Application No. 13306806.4, filed Dec. 20, 2013.

TECHNICAL FIELD

The present invention relates to a method and an apparatus for performing depth estimation in 3D imaging.

BACKGROUND

Acquiring depth information in a scene is one of the most fundamental and challenging problems in imaging. The estimation of the depth of an object in a scene finds many applications in areas such as robotics, gaming, gesture recognition, 3D visual entertainment and the like. In particular, depth information can bring added value to recorded images for Television and Cinema production. Indeed, information related to the depth of objects in a scene is useful for different purposes, such as visual effects and conversion of images from 2D-to-3D for 3D screening. Depth information is also useful for view synthesis at the viewing end, for example, to adapt the image content to the stereoscopic display used. Depth information can be delivered with the corresponding image data in the video stream, to the device rendering the images.

Techniques for acquiring depth information can generally be classified into two types: passive methods in which multiple cameras are used to record images of a scene from multiple different view-points and disparity estimation is performed using the acquired stereo images, and active methods in which depth is estimated based on active illumination of the scene and object reflection. For active methods Time-of-Flight (ToF) or structured light devices may be used. A ToF camera measures the phase shift of the reflected light relative to its modulated light source and calculates the distance between the camera and the observed objects. Each type of technique has its own advantages and drawbacks. Passive methods have been well-studied and only require video images. They are erroneous, however, in occluded regions (regions of the scene which are not visible from the selected viewpoints) and inaccurate in poor-textured regions (for example regions of uniform colour). Active methods, on the other hand, can provide accurate measurements in these critical areas but present other technology-specific limitations. For example, ToF devices produce dense depth maps but with very low resolution. On the other hand, structured light devices provide stable measurements with higher image resolution, but present holes in areas where the pattern cannot be detected, such as structured light shadows, absorptive, transparent and reflective material, as well as slanted surfaces.

Considerable attention has been dedicated to combining active and passive methods in the last few years, with the spread of affordable depth sensing devices. The proposed methods however are complex and time consuming. The present invention has been devised with the foregoing in mind.

SUMMARY

According to a first aspect of the invention there is provided a method of processing image data of a scene to provide depth information of the scene, the method comprising:

providing, at each of a plurality of spatial resolution levels, a set of stereo images of the scene corresponding to a passive depth estimation technique, and an active depth map corresponding to an active depth estimation technique;

obtaining, at a higher spatial resolution of the stereo images and respective active depth map, a global disparity map (245) based on an estimated stereo disparity between corresponding pixels of the respective set of stereo images at the said higher spatial resolution and on a determined consistency between the estimated stereo disparity and the respective active depth map of the scene at the higher spatial resolution; and wherein the disparity values of the global disparity map at the higher spatial resolution are each estimated within a restricted disparity range determined based on disparity values of a global disparity map previously estimated for a corresponding set of stereo images and active depth map of the scene at a lower spatial resolution.

The invention benefits from the respective advantages associated with the complementary active and passive techniques. Passive disparity estimation and active depth acquisition are merged to provide robust and high-quality depth maps. Processing according to a hierarchical framework enables the process to be speeded up since disparity estimation from a previous level of spatial resolution may be exploited to restrict the disparity estimation at a higher level.

In an embodiment the global disparity map is obtained according to the minimization of a cost function based on the estimated stereo disparity between corresponding pixels of the respective set of stereo images at the said higher spatial resolution and on the determined consistency between the estimated stereo disparity and the respective active depth map of the scene at the higher spatial resolution. In an embodiment the global disparity map for a current resolution level is determined based on the reliability of active sensor depth of the current spatial resolution level and the stereo matching of the previous lower resolution level.

In an embodiment the method further comprises determining, at the lower resolution level, a matching reliability parameter representative of the reliability of matching between the respective stereo images, wherein the matching reliability parameter acquired at the lower resolution level is used in the cost function as a weighting factor of a matching error of the stereo images at the higher spatial resolution level.

By using the matching reliability parameter already determined at a lower level of spatial resolution, processing at the higher level of spatial resolution can be performed more rapidly.

The set of stereo images includes two or more stereo images. In one particular embodiment the set of stereo images includes three stereo images.

In an embodiment the method further comprises obtaining at the higher spatial resolution an active reliability parameter representative of the reliability of the active depth estimation technique for a respective pixel of the active depth map at the higher spatial resolution and wherein the active reliability parameter obtained at the higher resolution level is used in the cost function as a weighting factor of the determined consistency at the said higher spatial resolution level.

In an embodiment the disparity for the global disparity map is determined based on the minimization of the cost function $E_{global}^{k}(p,d)$, the cost function for a pixel p at a spatial resolution k being expressed as $$E_{global}^{k}(p,d) = R_{match}^{k-1}(p)E_{match}^{k}(p,d) + \lambda R_{sensor}^{k}(p) E_{sensor}^{k}(p,d) \text{ where}$$

$E_{match}^k$ is representative of stereo disparity between the pair of stereo images;

$R_{match}^{k-1}$ refers to the matching reliability calculated at a previous level of lower resolution k−1 for corresponding stereo images;

$E_{sensor}^k$ is representative of the consistency between the estimated stereo disparity and the respective active depth map;

$R_{sensor}^k$ refers to the active reliability parameter representative of the reliability of the active depth estimation technique.

In an embodiment the consistency between the estimated stereo disparity and the respective active depth map is expressed as $$E_{sensor}^k(p,d) = (d - D_{sensor}^k(p))^2 \text{ where:}$$

$D_{sensor}^k(p)$ is the disparity computed at resolution level k from the depth acquired at pixel p in the active depth map and d is the corresponding disparity estimated from the set of stereo images.

In an embodiment the method further comprises at a given level of spatial resolution determining a global reliability factor representative of the reliability of a fusion of the active depth map and the corresponding estimated stereo disparity at the given level of spatial resolution.

According to a second aspect of the invention there is provided an image processing device for processing image data of a scene to provide depth information of the scene, the device comprising a processor configured to:

obtain, at each of a plurality of spatial resolution levels, a set of stereo images of the scene corresponding to a passive depth estimation technique, and an active depth map corresponding to an active depth estimation technique;

obtain, at a higher spatial resolution of the stereo images and respective active depth map, a global disparity map according to a cost function based on an estimated stereo disparity between corresponding pixels of the respective set of stereo images at the said higher spatial resolution and on a determined consistency between the estimated stereo disparity and the respective active depth map of the scene at the higher spatial resolution; and wherein the disparity values of the global disparity map at the higher spatial resolution are each estimated within a restricted disparity range determined based on disparity values of a global disparity map previously estimated for a corresponding set of stereo images and active depth map of the scene at a lower spatial resolution.

In an embodiment the processor is configured to determine, at the lower resolution level, a matching reliability parameter representative of the reliability of matching between the respective stereo images, wherein the matching reliability parameter acquired at the lower resolution level is used in the cost function as a weighting factor of the estimated stereo disparity at the higher spatial resolution level.

In an embodiment the processor is configured to obtain at the higher spatial resolution an active reliability parameter representative of the reliability of the active depth estimation technique for a respective pixel of the active depth map at the higher spatial resolution and wherein the active reliability parameter obtained at the higher resolution level is used in the cost function as a weighting factor of the determined consistency at the said higher spatial resolution level.

In an embodiment the processor is configured to determine the disparity for the global disparity map based on the minimization of the cost function $E_{global}^k(p,d)$ the cost function for a pixel p at a spatial resolution k being expressed as $$E_{global}^k(p,d) = R_{match}^{k-1}(p).E_{match}^k(p,d) + \lambda.R_{sensor}^k(p).E_{sensor}^k(p,d) \text{ where}$$

$E_{match}^k$ is representative of stereo disparity between the pair of stereo images;

$R_{match}^{k-1}$ refers to the matching reliability calculated at a previous level of lower resolution k−1 for corresponding stereo images;

$E_{sensor}^k$ is representative of the consistency between the estimated stereo disparity and the respective active depth map;

$R_{sensor}^k$ refers to the active reliability parameter representative of the reliability of the active depth estimation technique.

In an embodiment the processor is configured to determine the consistency between the estimated stereo disparity and the respective active depth map according to the following expression:

$$E_{sensor}^k(p,d) = (d - D_{sensor}^k(p)) \text{ where:}$$

$D_{sensor}^k(p)$ is the disparity computed at resolution level k from the depth acquired at pixel p in the active depth map and d is the corresponding disparity estimated from the set of stereo images.

In an embodiment the processor is configured to, at a given level of spatial resolution, determine a global reliability factor representative of the reliability of a fusion of the active depth map and the corresponding estimated stereo disparity at the given level of spatial resolution.

In an embodiment the set of stereo images includes three stereo images.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system'.

Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RE signal.

BRIEF DESCRIPTION OF THE DRAWINGS

Embodiments of the invention will now be described, by way of example only, and with reference to the following drawings in which.

DETAILED DESCRIPTION

Figure 1:
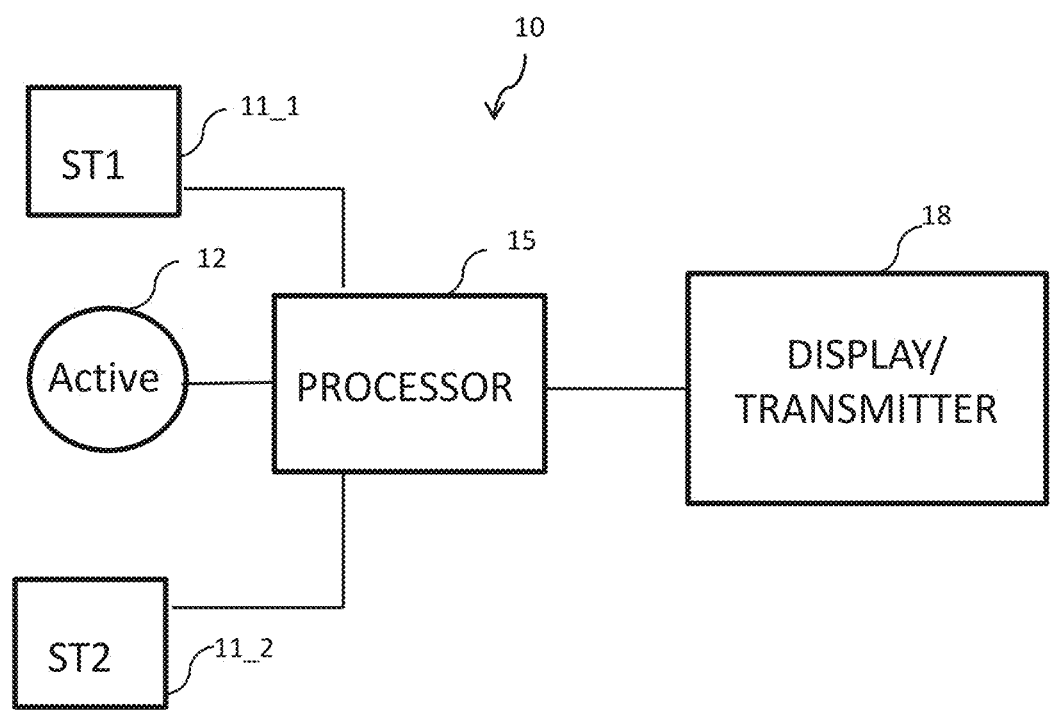
FIG. 1 is a block diagram illustrating an example of a system for providing depth estimation in accordance with a first embodiment of the invention.

FIG. 1 is a schematic block diagram illustrating components of a system for estimating depth information in a scene according to a first embodiment of the invention. With reference to FIG. 1, the depth estimation system 10 comprises a set of passive depth sensor type cameras 11_1 and 11_2 for acquiring images of the same scene S from different view-points in order to provide multiple views or stereo images. A camera of active depth sensor type 12 is provided to illuminate an object in the scene S with a pattern of structured light, and to obtain in response an active depth map. A processing unit 15 is provided to process the data from the stereo cameras 11_1 and 11_2 and the active type camera 12, to estimate depth information. After processing, images containing depth information may be displayed on display device 18. For example using the estimated depth information, 3D images may be displayed. It will be appreciated, however that in some embodiments of the invention the depth information may be transmitted to a remote device. In such cases the depth information may be encoded prior to transmission to the remote device.

Passive range sensor type cameras 11_1 and 11_2 provide a pair of stereo images for performing disparity estimation. The term disparity generally describes the offset of a pixel in an image taken from one of the stereo cameras relative to the corresponding pixel of the corresponding image taken from the other of the stereo cameras. The offset relationship between the two corresponding pixels is used to determine the depth of an associated 3D point in the scene. In practice disparity is inversely proportional to the depth z (distance of an object from the camera), such that a small disparity value corresponds to a large depth distance in the recorded scene.

Corresponding pixels, as used in the present disclosure, refer to pixels of each stereo image of a set associated with the same point of a 3D object in a scene. A plurality of disparity values for a stereo set of images are stored in a data structure referred to as a disparity map. A disparity map associated with a set of stereo images provides the pixel to pixel correspondence between corresponding pixels in the two images. Indeed, the disparity map associated with a stereo set of images represents a two-dimensional (2D) function, d(x, y), that maps pixel coordinates (x, y) in one of the images to disparity values (d). The disparity value d corresponding to any pixel coordinate in an image of the stereo pair corresponds to the shift in terms of pixel coordinates that needs to be applied to find the corresponding pixel in the other image of the stereo pair of images.

As an example, satellite Iconix Studio 2K™ cameras may be used as passive range sensor type cameras 11_1 and 11_2.

The active range sensor type camera provides a depth map by illuminating objects in the scene S with a pattern of structured light. As an example a PrimeSense Kinect™ device may be used as the active range sensor type camera 12 to provide depth measurements. In one particular embodiment the active range sensor type camera 12 is arranged over the passive sensor type cameras 11_1 and 11_2.

Figure 2:
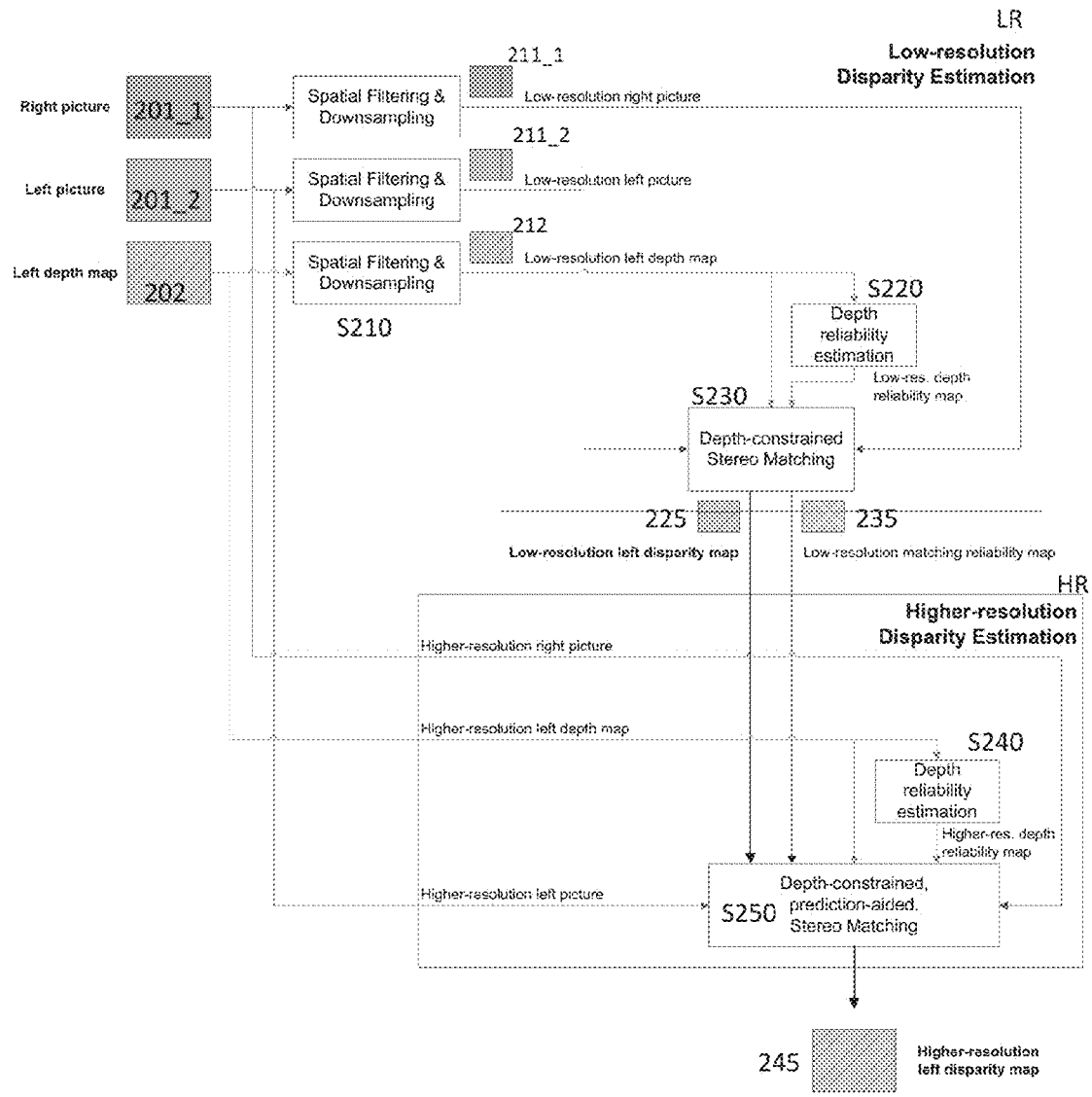
FIG. 2 is a block diagram illustrating steps of a method for providing depth estimation in accordance with an embodiment of the invention.

FIG. 2 is a schematic block diagram illustrating steps of a method carried out by processing unit 15 for performing depth estimation in accordance with an embodiment of the invention. Inputs to the processing unit 15 include the pair of stereo images 201_1 and 201_2 obtained by the passive sensor type cameras 11_1 and 11_2, and the depth map 202 obtained by active sensor type camera 12.

Figure 4:
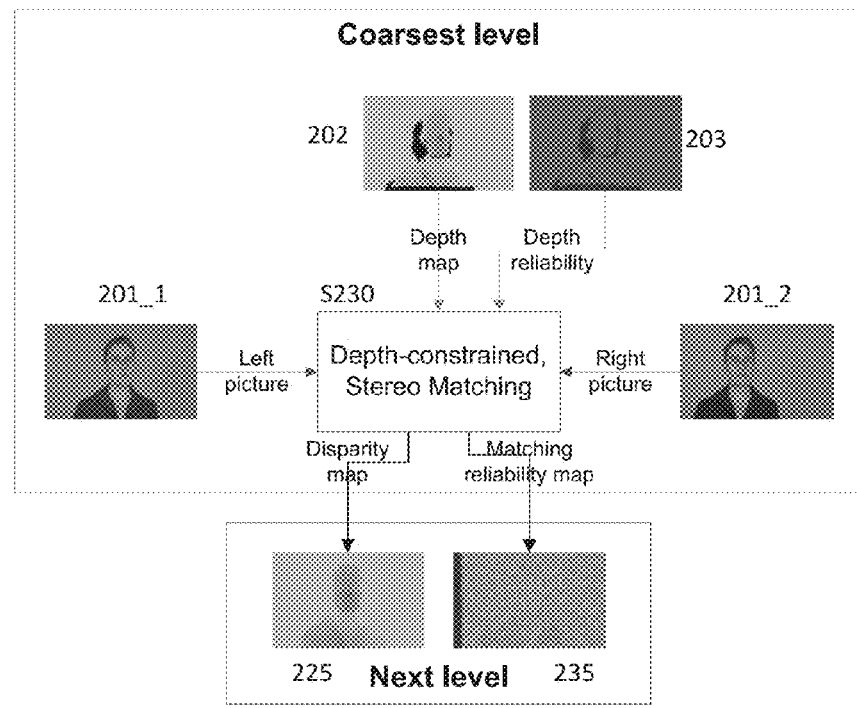
FIG. 4 is a block diagram illustrating steps of a process at a lower resolution level for providing disparity and reliability data to a higher level of resolution in accordance with an embodiment of the invention.
Figure 5:
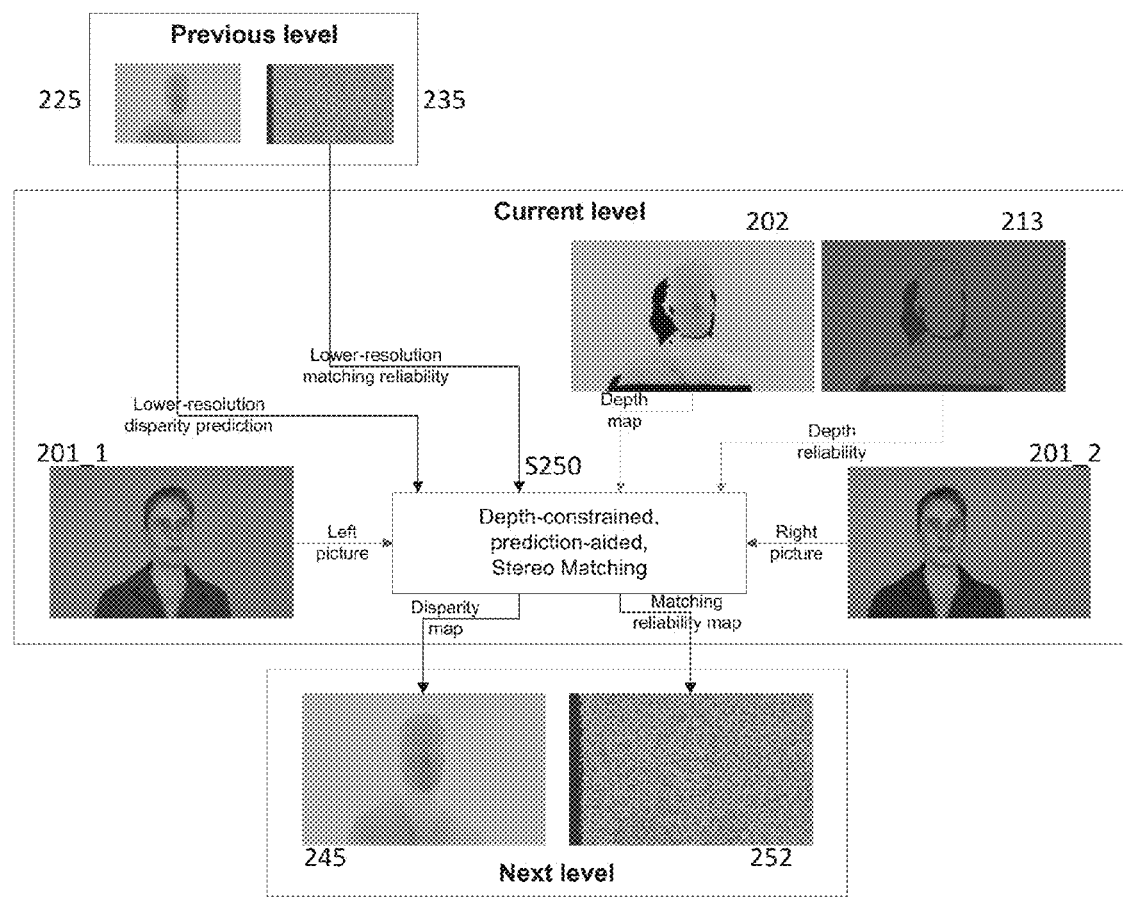
FIG. 5 is a block diagram illustrating steps of a process at a higher resolution level for providing disparity and reliability data to a further higher level of resolution in accordance with an embodiment of the invention.

The overall process implements a hierarchical style processing in which disparity estimations are performed from a low (coarse) level of image resolution to one or more higher levels of image resolution, resolution level by resolution level. The processing at a higher (finer) level of resolution disparity data uses disparity data and reliability data obtained from processing at a lower resolution level. The disparity data obtained at a lower level of resolution is used to limit the estimation range of disparity at a higher level of resolution. This is done by refining, at each successive level of resolution, the calculation of disparity around the corresponding disparity value computed at the previous level of resolution. Reliability estimated at a lower level of resolution is used in the calculation of disparity at a higher level of resolution. FIG. 4 is a schematic block diagram illustrating processing steps at a lower resolution level of the process. FIG. 5 is a schematic block diagram illustrating processing steps at a higher resolution level of the process.

As an initial step of the process the stereo images 201_1 and 201_2 and the depth map 202 are spatially filtered and down sampled in step S210 to corresponding stereo images 211_1 and 211_2 and a depth map 212 at a first lower resolution level. The resolutions of the stereo images $201\_{_1}$ and $201\_{_2}$ may differ to the resolution of the depth map 202 obtained from the active sensor type camera. In such a case scaling is performed so that each 2D data set has the same resolution. In the case of a depth map obtained from a Kinect type active sensor device, for example, applying an active technique hole filling may be performed extending background values horizontally and vertically.

Figure 3:
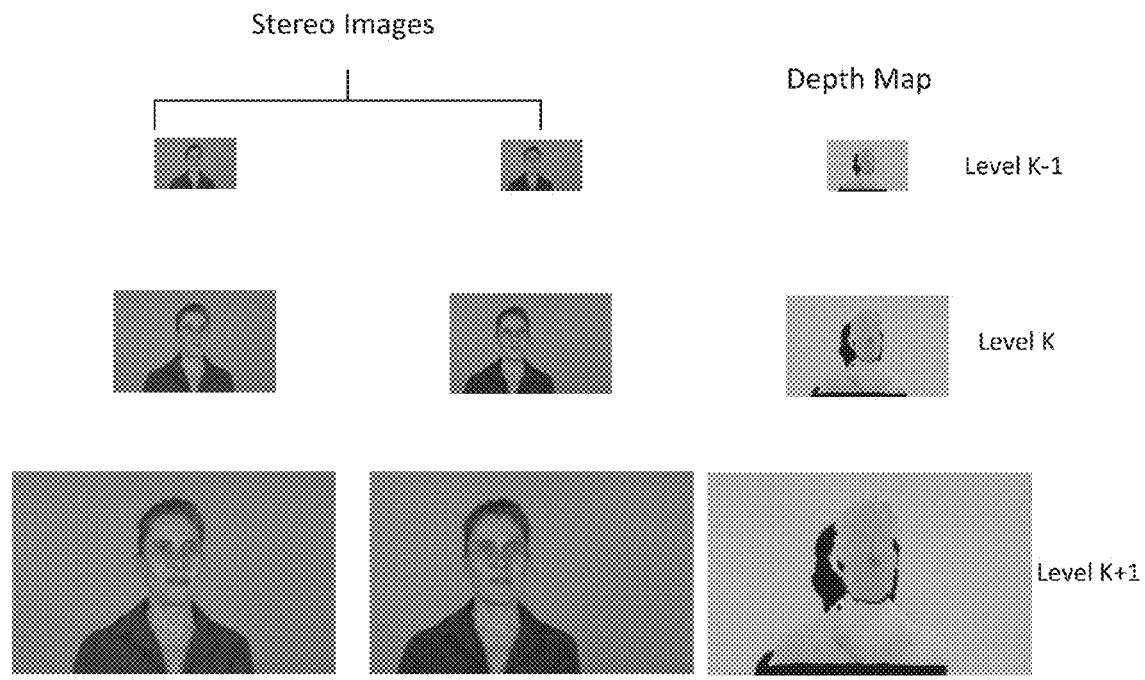
FIG. 3 is a block diagram schematically illustrating en example of image and map down sampling in accordance with a first embodiment of the invention.

FIG. 3 illustrates an example of a hierarchical multi-resolution framework in which original images obtained at level k+1 are down-sampled to a level of lower spatial resolution, level k, and to a lower level of further lower spatial resolution level k−1. Although the example of FIG. 3 illustrates 3 levels of spatial resolution, it will be appreciated that in embodiments of the invention any number N of levels of spatial resolution of corresponding images may be obtained by down-sampling the recorded stereo images and depth map.

The stereo images and corresponding depth map of lower resolution are processed before the stereo images and corresponding depth map at higher spatial resolution. Steps S220 and S230 are performed at lower spatial resolution (LR). In step S220 a reliability estimation is performed on the down-sampled and filtered depth map 212. The outcome of step S220 is a 2D data set of reliability values, referred to as a depth reliability map 203. The accuracy of a ToF camera for example may be influenced by environmental conditions such as lighting or the colour and characteristics of the objects being imaged. The depth reliability map gives an insight into the accuracy and is used to provide weighting factors in the cost function used to determine disparity map 242 at that level of spatial resolution.

In step S230, as schematically illustrated in FIGS. 2 and 4, a process of stereo matching is performed. Inputs to the stereo matching step include the down sampled and filtered pair of stereo images 211_1 and 211_2, the down sampled and filtered depth map 212, and the depth reliability map 203 obtained from step S220. At the lowest level of spatial resolution, disparity is estimated within a determined range of disparity values which may for example by preset or specified by the user. The stereo matching process generates a disparity map 225 of disparity values for pixels of the down-sampled stereo images. A matching reliability estimation is also performed in step S230 to provide a matching reliability map 235. The lower resolution disparity map 225 and the lower resolution matching reliability map 235 are output from step S230 for processing at the next higher level of resolution (HR). The matching reliability map is used to provide weighting factors in the cost function used to determine disparity map 245 at the next higher level of spatial resolution. Indeed at each level of spatial resolution k matching reliabilities are computed and stored for the next level of spatial resolution k+1.

At the higher level of resolution (HR) higher resolution versions of stereo images 201_1 and 201_2 and the depth map 202 are input to the processing step. The higher resolution datasets may, as illustrated in FIG. 2, correspond to the resolution of the stereo images 201_1 and 201_2 and the depth map 202 as obtained from passive cameras 11_1 and 11_2 and active camera 12, or they may be down-sampled versions at a higher resolution than the first lower level of resolution. In step S240 a higher resolution reliability map 213 is obtained from the higher resolution depth map 202.

In step S250 a process of stereo matching is performed at the higher level of resolution. With reference to FIGS. 2 and 5 inputs to the stereo matching step include the higher resolution stereo images 201_1 and 201_2, the higher resolution depth map 202, and the higher resolution reliability map 213 obtained from the depth reliability estimation step S240. The lower resolution disparity map 225 and the lower resolution matching reliability map 235 obtained from the processing of the previous lower resolution level (LR) are also input to processing step S250. The lower resolution disparity map 225 is used to limit the range of values applied for the estimation of the disparity values in step S250. This enables the speed of the process to be increased for each disparity estimation since the estimation process is limited to values in a limited range around the corresponding disparity obtained at the previous resolution level. The matching reliability map 235 of the lower resolution level is used in the stereo matching calculation of the higher resolution level which also helps to speed up the stereo matching process since there is no need to await the estimation of the matching reliability at the higher level of resolution. The output of the constrained stereo matching depth processing step is a disparity map 245 and a matching reliability map 255 at a higher resolution than the corresponding outputs of the previous resolution level. The output disparity map 245 and matching reliability map 255 may in turn be processed at the next higher level of resolution for a corresponding stereo matching process.

The stereo matching process for depth estimation in steps S230 and S250 includes the following calculations.

At each successive resolution level k (where the lower the value of k, the lower/coarser the level of resolution) a disparity map is estimated using the corresponding pair of stereo images (for example 211_1 and 211_2 or 201_1 and 201_2) and the depth map (212 or 202) by minimizing for each pixel p, a global energy term $E_{global}^k(p,d)$ acting as a cost criterion. The disparity $d^k(p)$ of pixel p is thus estimated to minimize its global energy $E_{global}^k(p,d)$ as follows:

$$\hat{d}^k(p) = \underset{d}{\mathrm{Argmin}}\{E_{global}^k(p,d)\} \quad (1)$$

The operation is performed for every pixel in order to provide a disparity map.

The global energy function $E_{global}^k(p,d)$ is a weighted sum of a matching term $E_{match}^k$ corresponding to a matching error for the pair of stereo images and a consistency term $E_{sensor}^k$ associated with the active type sensor. Each term is weighted with a respective reliability or confidence coefficient R:

$$E_{global}^k(p,d) = R_{match}^{k-1}(p) \cdot E_{match}^k(p,d) + \lambda \cdot R_{sensor}^k(p) \cdot E_{sensor}^k(p,d) \quad (2)$$

where $\lambda>0$ is a gain parameter used to make both energy terms consistent.

Passive matching term $E_{match}^k$ corresponds to a matching error for the pair of stereo images. The matching term $E_{match}^k$ used in the stereo matching step S230 or S250 may for example be obtained by applying mathematical matching techniques such as the Sum of Absolute Differences (SAD), the Sum of Squared Differences (SSD), or the Zero-mean SSD (ZmSSD), etc.

In one embodiment the technique of Zero-mean Sum of Squared Differences (ZSSD) is used for the matching term $E_{match}^k$. For example, in the case of a stereo pair of images referred to as a left image and a right image, the Zero-mean Sum of Squared Differences for the matching term $E_{match}^k$ may be expressed as follows:

$$E_{match}^k(p,d) = \Sigma_{y \in B_p}[(I_k^{LEFT}(p) - \overline{I_k^{LEFT}}|_{B_p}) - (I_k^{RIGHT}(p+d) - \overline{I_k^{RIGHT}}|_{B_{p+d}})]^2 \quad (3)$$

Where $I_k^{LEFT}$ corresponds to the luminance of the first (left in the example) stereo image and $I_k^{RIGHT}$ is the luminance of the second (right in the example) stereo image of the stereo pair of images at resolution level k, and $\overline{I}_{|B}*$ is the mean value of I over the nxm neighborhood block (correlation window) $B_*$ around pixel * for the respective first or second stereo image.

In one particular embodiment of the invention, in order to handle occlusions in first/second (e.g. left/right) stereo images obtained from passive sensor type cameras 11_1/11_2, the lower matching energy is considered:

$$E_{match}(p,d) = \Psi_m(\min(E_{match}^{left}(p,d); E_{match}^{right}(p,d))) \quad (4)$$

It may be noted that the resolution index k is omitted for sake of clarity. In some embodiments of the invention the matching term may be subject to a sub-quadratic penalization for the sake of robustness against outliers, using the regularized $L_1$ norm $\Psi_m(t) = \sqrt{t + \epsilon_m}$, with $\epsilon_m = 10^{-6}$.

Reliability coefficient $R_{match}^{k-1}$ refers to the matching reliability calculated at a previous level of lower resolution k−1. For example, with reference to FIGS. 2 and 5, the matching reliability map 235 calculated in step S230 (resolution level k−1) for stereo images 211_1 and 211-2 is used in step S250 (resolution level k) for the energy function calculation for disparity refinement at the higher level of resolution for higher resolution stereo images 201_1 and 201_2.

Indeed, in the hierarchical framework of embodiments of the invention, depth estimation at a given resolution level inherits an assessment of local matching reliability from a previous lower level of resolution, and refines it for next higher level of resolution. This avoids the shortcomings of two-pass, a posteriori fusion of disparity estimation and depth sensing. Indeed, since the reliability data of the previous level of resolution is used, the disparity estimation may be performed, in parallel with the reliability determination at that level k. The speed of processing is increased since there is no need to wait until the reliability matching data at level k has been determined before performing the stereo matching calculation at level k. A one-pass process may thus be performed presenting better trade-off in terms of quality and resolution versus real-time performances.

The matching reliability coefficient $R_{match}^{k-1}$ is calculated as a weighting for matching error term $E_{match}^{k}$ to obtain disparity maps 225 and 245 in steps S230 and S250, respectively. At the lowest level of resolution of the processing chain, reliability weights are set to 1 across the entire reliability map for all pixels, then at each subsequent level of resolution, matching errors are temporally stored in order to compute matching reliability maps 235 and 252 in steps S230 and S250, respectively, by determining the normalized difference of first and third smallest matching energy terms as follows:

$$0 \geq R_{match}^{k}(p) = \frac{\inf_3\{E_{match}^{k}(p, d)\} - \min_d\{E_{match}^{k}(p, d)\}}{\inf_3\{E_{match}^{k}(p, d)\}} \leq 1 \qquad (5)$$

where min{ } and $\inf_3${ } respectively denote lowest and third lowest values.

The operation is performed for each pixel p in order to provide the matching reliability map 235 or 255.

It may be noted that matching reliability weighting $R_{match}^{k}$ does not depend on the tested depth value d but only on spatial features located in the neighborhood of pixel p. If correspondences are sharp, matching differences increase swiftly around the best candidate and the corresponding reliability $R_{match}^{k}$ tends towards 1 indicating better reliability. On the contrary, if matching is inefficient (for example, on occlusions), the gap between the lowest and third lowest energy values is smaller and $R_{match}^{k}$ decreases towards 0, indicating lower reliability. For example high reliability values may occur on sharp spatial details, whereas low reliability values may be found along occlusions on objects edges and in poor texture areas.

The consistency term is used to constrain the disparity estimation. The active/passive consistency cost term $E_{sensor}^{k}(p,d)$ is representative of the depth consistency between the stereo matching and the active depth measurement and is defined as:

$$E_{sensor}^{k}(p,d) = (d - D_{sensor}^{k}(p))^2 \qquad (6.1)$$

Where $D_{sensor}^{k}(p)$ is the disparity computed at resolution level k from the depth acquired at pixel p with the active type sensor and d is the corresponding disparity estimated from the set of stereo images. The aim is to minimize this consistency cost function $E_{sensor}^{k}(p,d)$ In practice the consistency term measures the deviation of estimated depth z corresponding to the estimated disparity d ($d \propto 1/z$) of the stereo image set with respect to depth $z_{sensor}^{k}$ measured by the active sensor type camera 12 for pixel p and may be expressed as:

$$E_{sensor}^{k}(p, z) = \left(\left|\frac{1}{z} - \frac{1}{z_{sensor}^{k}(p)}\right|^2\right) \qquad (6.2)$$

where $z_{sensor}^{k}$ denotes a depth sensor map at resolution level k.

In one particular embodiment of the invention the term $\Psi_s$ is included in the consistency term where $\Psi_s(t) = \sqrt{t + \epsilon_s}$ is another regularized $L_1$ norm, with $\epsilon_s = 10^{-4}$.

$$E_{sensor}^{k}(p, z) = \Psi_s\left(\left|\frac{1}{z} - \frac{1}{z_{sensor}^{k}(p)}\right|^2\right) \qquad (7)$$

and $z_{sensor}^{k}$ denotes depth sensor map at resolution level k.

The consistency term $E_{sensor}^{k}(p,z)$ is weighted by depth sensing reliability term $R_{sensor}^{k}$ dependent on the pixel location as performed in step S220 or step S240. In one embodiment in which a structured light device is used to acquire the depth map, the reliability is binary. For example $R_{sensor}^{k}(p) \in \{0,1\}$ denotes the active sensor depth map reliability at pixel p at a current resolution level k:

$R_{sensor}^{k}(x) = 0$ in structured light shadows and along objects edges (detected with a Canny filter);

$R_{sensor}^{k}(x) = 1$ everywhere else.

In another particular embodiment reliability weighting $R_{sensor}^{k}$ presents three levels of reliability corresponding to a re-projected Kinect depth sample ($R_{sensor}^{k}(p)=1$), to a hole that has been filled during pre-processing ($R_{sensor}^{k}(p)=0.25$), or to a depth map contour or an unfilled hole ($R_{sensor}^{k}(p)=0$).

In order to balance the energy levels of data and consistency terms in Equation (2), the gain parameter is empirically set to $\lambda = 100 \times n \times m$ At each resolution level, a global reliability factor $R_{global}^{k}$ be computed in a similar way as the matching reliability factor $R_{match}^{k}$ as previously described with reference to equation (6):

$$0 \leq R_{global}^{k}(p) = \frac{\inf_3\{E_{global}^{k}(p, d)\} - \min_z\{E_{global}^{k}(p, d)\}}{\inf_3\{E_{global}^{k}(p, d)\}} \leq 1 \qquad (8)$$

The global reliability factor $R_{global}^{k}$ gives an insight as to how reliable are the fusion of the depth map and the disparity estimated from the stereo images: the closer the lowest and third lowest energy levels are, the lower the global confidence. Compared to a sensor reliability map and a matching reliability map, the global reliability map reveals uniform reliability both in textured and non-textured areas, as well as in former Kinect holes. Lower reliability values occur only along objects and characters edges.

At each resolution level the global reliability map can be used for multi-lateral filtering of the depth map fused together with a colour image of the corresponding set of stereo images. In practice a right depth map is filtered with a corresponding right stereo image and a left depth map is filtered with a corresponding left stereo image. In this way unreliable depth values can be corrected by more reliable neighbors. In practice a single depth map (right or left) is obtained and fused with the corresponding right or left stereo image.

As mentioned previously during the hierarchical processing the disparity is estimated within a constrained range at each level k of resolution. At the coarsest (lowest) resolution level k=0, disparity is estimated for each pixel p within a predetermined range that is for example preset or selected by the user:

$$d_0(p) = \min_{d_{min} < d < d_{max}} E_0(p,d) \quad (9)$$

At higher levels of resolution k+1, 0≤k<N−1, disparity is refined around the disparity estimated at previous level of revolution k:

$$d_{k+1}(p) = \min_{|d-2 \cdot d_k(p)| < \delta} E_{k+1}(p,d) \quad (10)$$

Since at the coarsest level of resolution k=0, a matching reliability has not yet been computed, the reliability is set at 1 and the equation (2) becomes:

$$E_{global}^0(p,d) = E_{match}^0(p,d) + \lambda \cdot R_{sensor}^0(p) \cdot E_{sensor}^0(p,d) \quad (11)$$

Figure 6:
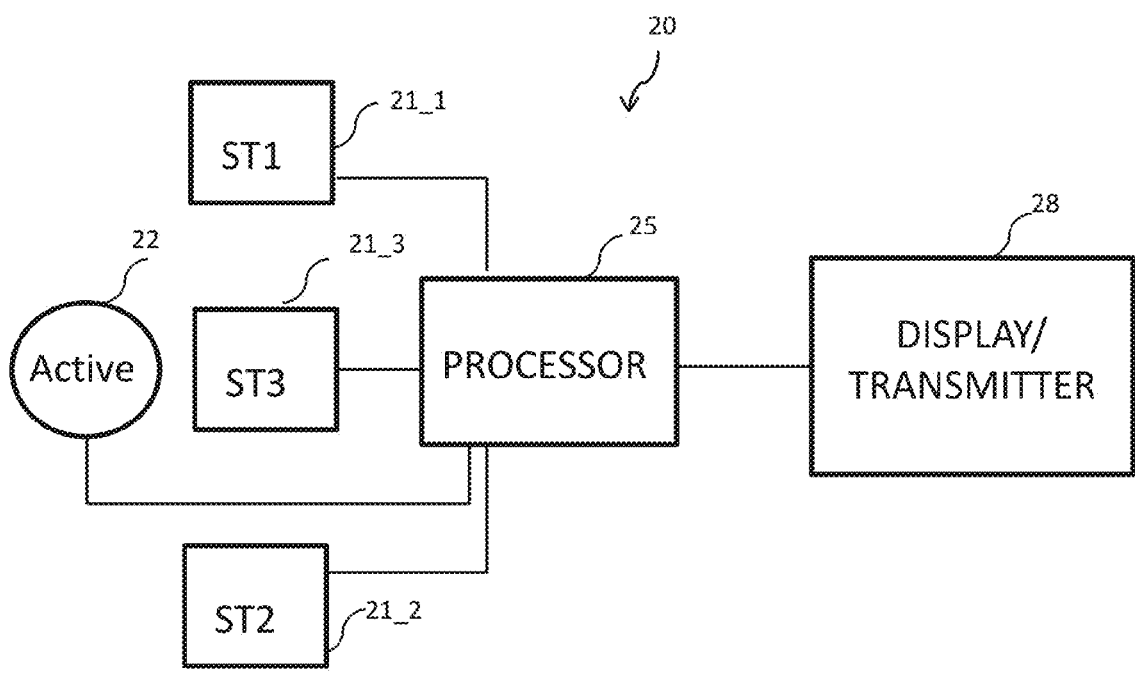
FIG. 6 is a block diagram illustrating an example of a system for providing depth estimation in accordance with a second embodiment of the invention.

FIG. 6 is a schematic block diagram illustrating components of a system for estimating depth information in a scene according to a further embodiment of the invention. The system of FIG. 6 differs to that of the system of FIG. 1 in that three cameras are used to provide stereo images, two side cameras 21_1 and 21_2, and a central camera 21_3 located between the left and right side cameras 21_1 and 21_2. In this embodiment the active sensor type camera 22 provides a central depth view corresponding to the stereo image acquired by the central camera 21_3.

Having three cameras, helps to overcome occlusion issues in disparity estimations. In the global energy minimization, both depth sensor and disparity contributions are weighted by respective reliability factors as described in the previous embodiment.

In this particular example with three stereo cameras, a ZSSD technique is applied and the stereo images are pre-processed to remove local means computed in a n×m neighborhood block. A left matching error term and a right matching error term are defined as follows:

$$\begin{cases} E_{match}^{left}(p,z) = \sum_{(u;v) \in B_p} |f_{center}(u,v) - f_{left}(u + d_{left}(z), v)|^2 \\ E_{match}^{right}(p,z) = \sum_{(u;v) \in B_p} |f_{center}(u,v) - f_{right}(u + d_{right}(z), v)|^2 \end{cases} \quad (12)$$

where $f_{left/center/right}$ denotes preprocessed left, center or right luminance frame respectively, $d_{left/right}(z)$ denotes the disparity from the center camera to the left/right camera corresponding to depth z, and $B_p$ denotes the n×m correlation window around pixel p.

In one particular embodiment high quality video may be acquired using a professional RED ONE® camera, for example. As an example satellite Iconix Studio 2K™ cameras may be used, as passive stereo cameras 21_1, 21_2 and 21_3 to estimate disparity information. A PrimeSense Kinect™ device may be used as an active sensor type camera 22 to provide active depth measurements. The active sensor type camera 22 may be placed above the passive stereo type cameras 21_1, 21_2 and 21_3.

In such a particular embodiment, having satellite cameras attached to a main camera body, the overall imaging rig for depth estimation presents a 15 cm left-to-right interaxial distance. The infra-red (IR) sensor of the active sensor type camera 22 is vertically aligned with the central lens of central stereo type camera 21_3, 7 cm above.

Since in this particular embodiment, colour images are acquired in HD 1280×720. Kinect IR pictures and depth maps may be up-scaled as a preliminary step.

In another preliminary step the lenses of the four cameras (left 21_1, central 21_3 and right 21_2 cameras, and the active sensor type camera 22) are calibrated using standard routines in order to determine their intrinsic parameters as well as radial and tangential distortions. For IR calibration, pictures taken with a halogen light spot while occluding Kinect IR projector are used.

Extrinsic parameters may be determined, using the central camera 21_3 as a coordinate system reference. For the purpose of disparity estimation, the left, central and right views are epipolarly aligned. When three or more cameras are used, optical centers need not be aligned. A two-step rectification is performed which includes stereo rectification of the stereo type cameras 21_1, 21_2 and 21_3, then the rotation of the central camera 21_3 so that the three coordinate systems are parallel to one another.

Calibration of the depth signal from the active sensor type camera is also performed to determine parameters a and b such that:

$$\frac{1}{z} = a \cdot D_{sensor} + b \quad (13)$$

where z is the distance from an object to the camera, and $D_{sensor}$ the value of corresponding Kinect depth sample.

It may be noted that multimodal depth estimation requires disparity and Kinect maps to be consistent. To address this issue depth values from the active sensor type camera 22 are calibrated with respect to rectified pictures disparities, as described in what follows.

First, disparities are computed from a number of feature points detected in a rectified stereo pair from the stereo type cameras 21. Consider a pixel (u, v) in a central view and its disparity d with respect to, the corresponding pixel for example in the right view. Corresponding 3D points are reconstructed using central camera intrinsic parameters:

$$X = \begin{pmatrix} x \\ y \\ z \\ 1 \end{pmatrix} \equiv K_c^{-1} \cdot \begin{pmatrix} u \\ v \\ d \\ 1 \end{pmatrix}, \text{ with } K_c = \begin{pmatrix} f_x & 0 & c_u & 0 \\ 0 & f_y & c_v & 0 \\ 0 & 0 & 0 & f_x \cdot t_x \\ 0 & 0 & 1 & 0 \end{pmatrix} \quad (14)$$

where $K_c$ is the intrinsic matrix of the central camera extended to a 4×4 matrix, with $f_x$ and $f_y$ denoting focal lengths, $c_u$ and $c_v$ principal point's coordinates, and $t_x$ the center-right interaxial distance.

These 3D points are then projected onto the depth sensor in order to retrieve corresponding Kinect values $D_{sensor}$ at pixel coordinates $(u_s, v_s)$:

$$\begin{pmatrix} u_s \\ v_s \\ 1 \end{pmatrix} \equiv K_s \cdot (R_{c/s} \ T_{c/s}) \cdot \begin{pmatrix} R_{rect}^{-1} & 0 \\ 0 & 1 \end{pmatrix} \cdot X, \text{ with} \quad (15)$$

-continued $$K_s = \begin{pmatrix} f_x^s & 0 & c_u^s \\ 0 & f_y^s & c_v^s \\ 0 & 0 & 1 \end{pmatrix}$$

where $K_s$ denotes depth sensor instrinsic matrix, $R_{c/s}$ and $T_{c/s}$ corresponding rotation and translation matrices of central camera in depth sensor coordinate system, and $R_{rect}$ the rectification matrix of central camera. Finally, having collected a set of z and $D_{sensor}$ values corresponding to a number of feature points, parameters a and b of equation 13 are determined by linear regression using least squares.

Figure 7:
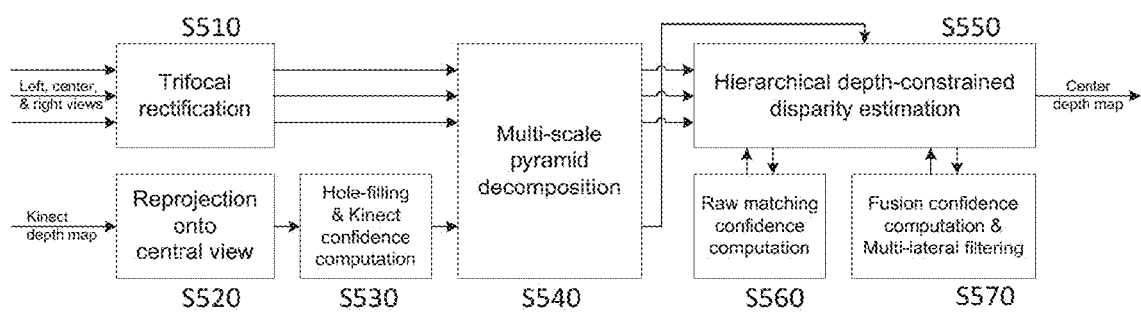
FIG. 7 is a block diagram illustrating steps of a method for providing depth estimation in accordance with the second embodiment of the invention.

Steps of the method for providing depth information of a scene in accordance with the second embodiment of the invention are schematically illustrated in FIG. 7. Inputs to the process include the images obtained from stereo type cameras 21_1, 21_2 and 21_3, and the depth map obtained from active type camera 22. In step S510 images from the stereo type cameras 21_1, 21_2 and 21_3 are undistorted and registered with respect to one another for disparity estimation. Depth map received from active type camera 22_1 is reprojected onto a reference view (for example the central stereo type camera 21_3 view) in step S520.

For example if the resolution of the stereo type cameras 21_1, 21_2 and 21_3 is HD 1280×720 and the depth map resolution of the active sensor type camera is VGA 640÷480 the depth map is up-sampled by a factor 2 in both the horizontal and vertical directions. 3D points are then reconstructed from each pixel of the up-scaled depth map, and projected back onto the view of the central camera 21_3:

$$\begin{pmatrix} u \\ v \\ d \\ 1 \end{pmatrix} \equiv K_c \cdot R_{rect} \cdot \begin{pmatrix} R_{c/s} & T_{c/s} \\ 0 & 1 \end{pmatrix}^{-1} \cdot K_{s'}^{-1} \cdot \begin{pmatrix} u_{s'} \\ v_{s'} \\ d_{s'} \\ 1 \end{pmatrix}, \text{ with} \quad (16)$$

$$K_{s'} = \begin{pmatrix} f_x^{s'} & 0 & c_u^{s'} & 0 \\ 0 & f_y^{s'} & c_v^{s'} & 0 \\ 0 & 0 & -b/a & 1/a \\ 0 & 0 & 1 & 0 \end{pmatrix}$$

where $K_{s'}$ denotes the 4×4 intrinsic matrix of up-sampled Kinect depth sensor.

It may be noted that in context of the present disclosure, "depth" z samples are actually stored as inverse depth values 1/z, so that processing, for example depth map interpolation is consistent with disparity estimations.

In step S530 hole filing is performed and a corresponding reliability map is generated. Holes in re-projected depth maps contain holes (typically depicted as black areas) that correspond either to Kinect IR shadows or to disocclusions induced by the viewpoint change. Basic hole-filling can be performed, extending background values horizontally or vertically. In order not to draw disparity estimation to potentially wrong anchors, filled holes are assigned to an intermediate low reliability value. The value of the reliability value can be tuned according to the complexity of the scene.

The images and depth map output from step S530 are spatially down-sampled into a resolution pyramid of different resolutions in step S540 to perform a process of depth constrained disparity estimation in step S550. For example, color frames from the stereo type cameras, depth maps and depth confidence maps are spatially filtered to build 4-level resolution pyramids. In the following, k=0 refers to the coarsest resolution level and k=3 to the original resolution level.

In step S560 a matching reliability map is computed as previously described. In step S570 global reliability factor is computed and multi-lateral filtering as previously described is performed.

The depth information determined may be stored for later use, encoded for transmitted to a local or remote destination(s) for example by broadcast, or used straight away to provide visual 3D effects on a 3D enabled display.

Based on an image of the stereo type images and a depth map as determined in accordance with embodiments of the invention, a 3D image may be rendered for viewing.

Figure 8:
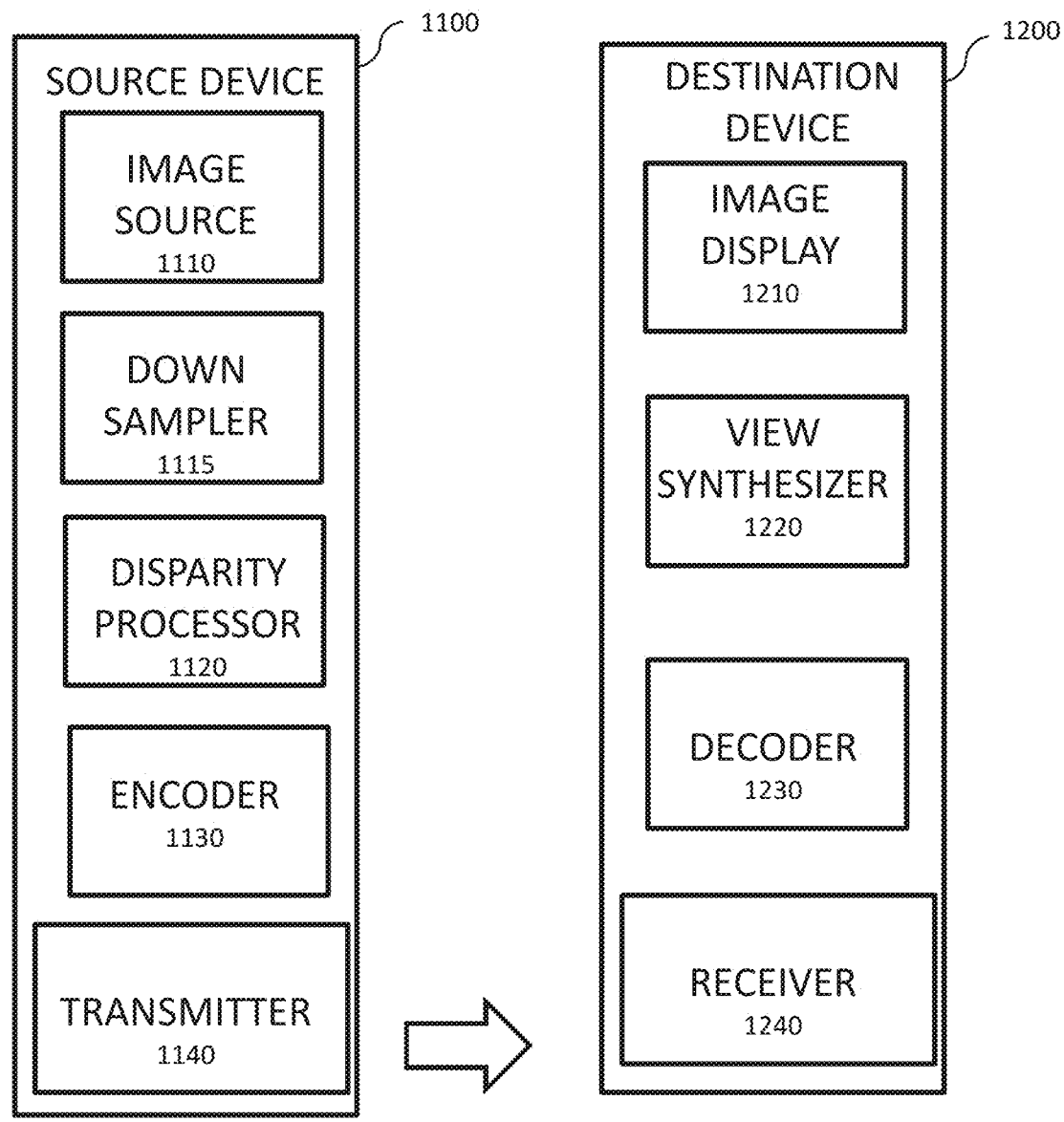
FIG. 8 is a block diagram illustrating a system in which embodiments of the invention may be implemented.

FIG. 8 is a block diagram illustrating a system in which embodiments of the invention may be implemented. The system 1000 includes a source device 1100 for acquiring image data and a destination device 1200 for providing 3D visualization of the acquired image data and depth map data. The source device 1100 comprises an image source 1110 for acquiring image data and depth map data, a down sampler 1115 for providing corresponding images and depth maps of different levels of spatial resolution, a disparity processing unit 1120 for processing the image data and depth map data in accordance with an embodiment of the invention to provide depth information, an encoder 1130 for encoding the depth information and corresponding image data, and a transmitter 1140. The destination device 1200 comprises a receiver 1240 for receiving encoded data transmitted from the source device 1100, a decoder 1230 for decoded received data to provide image data and corresponding depth information, a view synthesizing unit for processing the image data and depth information for 3D rendering of 3D images, and an display 1210 for visualization of 3D images. Source device 1100 and/or destination device 1200 may comprise wireless communication devices, such as wireless handsets, smart telephones or any wireless devices that can communicate picture and/or video information over a communication channel, in which case the communication channel may comprise a wireless communication channel. Destination device 1200 may be referred to as a three-dimensional (3D) display device or a 3D rendering device.

Image source 1110 provides a stereo pair of images, including a set of stereo images originating from passive sensor type cameras, and a depth map from an active sensor type camera to disparity processing unit 1120. A passive sensor type camera for providing stereo image of a set of stereo images may comprise an image sensor array, e.g., a digital still picture camera or digital video camera. In some embodiments the image source of the stereo images and the depth map may be a computer-readable storage medium comprising one or more stored images and/or a depth map. Alternatively the image source may be an interface for receiving digital images from an external source, a processing unit that generates digital images such as by executing a video game or other interactive multimedia source, or other sources of image data. Image source 1110 may generally correspond to a source of any one or more of captured, pre-captured, and/or computer-generated images. In some examples, image source 1110 may correspond to a camera of a cellular (i.e., mobile) telephone. In general, references to images herein include both still pictures as well as frames of video data. Thus, embodiments of the invention may apply both to still digital pictures as well as frames of captured digital video data or computer-generated digital video data.

Down-sampler 1115 provides corresponding images and depth maps of different levels of spatial resolution.

Disparity processor 1120 uses the stereo images and the active depth maps at different levels of resolution to generate 3D processing information by applying a method for estimating depth information in accordance with an embodiment of the invention. The processing performed by disparity processor 1120 includes depth reliability estimation S903. The 3D processing information provided by the disparity processing unit 1120 may, for example, include a disparity map or depth information determined in accordance with embodiments of the invention. Disparity processing unit 1120 transfers the 3D processing information at least one of the stereo images to encoder 1130, which encodes the stereo image and the 3D processing information to form encoded image data. Encoder 1130 may be configured to encode a still stereo image as a Joint Photographic Experts Group (JPEG) image for example. When the stereo image is a frame of video data, the encoder 1130 may be configured to encode the stereo image according to any video coding standard such as, for example Motion Picture Experts Group (MPEG), MPEG-2, International Telecommunication Union (ITU) H.263, ITU-T H.264/MPEG-4, H.264 Advanced Video Coding (AVC), ITU-T H.265, or other video encoding standards. Transmitter 1140 then transmits the encoded image data to destination device 1200.

It will be appreciated that the invention is not necessarily limited to wireless applications or settings. For example, embodiments of the invention may be applied to over-the-air television broadcasts, cable television transmissions, satellite television transmissions, Internet video transmissions, encoded digital video that is encoded onto a storage medium, or other scenarios. Accordingly, the communication channel may comprise any combination of wireless or wired media suitable for transmission of encoded video and/or picture data. The data may be transferred to a destination device in other ways such as by a wired connection, or the data may be recorded on a memory device readable by the destination device 1200.

The receiver module 1240 of destination device 1200 receives the encoded image data. Decoder 1230 decodes the encoded image data to extract at least one stereo image and 3D processing information. Based on the stereo image and the 3D processing information the view synthesizing unit 1220 can reconstructs a further stereo image corresponding to a different view. Based on the reconstructed view and the received view, the image display 1210 renders a three-dimensional image.

In some embodiments of the invention the reconstructed images may undergo additional processing at either the source device 1100 or destination device 1200. Moreover the disparity processing may be applied at the destination device instead of at the source device. In such a case the destination device receives a set of stereo images and a corresponding active depth map.

Embodiments of the invention described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, tablets, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been described with respect to the use of two or three stereo type cameras it will be appreciated that any multiple number of stereo type cameras may be used.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method of processing image data of a scene to provide depth information of the scene, the method comprising:
providing, at each of a plurality of spatial resolution levels, a set of stereo images of the scene corresponding to a passive depth estimation technique and an active depth map corresponding to an active depth estimation technique;
obtaining, at a higher spatial resolution level of the stereo images and respective active depth map, a global disparity map according to a cost function, the cost function being based on an estimated stereo disparity between corresponding pixels of the respective set of stereo images at the said higher spatial resolution level and on a determined consistency between the estimated stereo disparity and the respective active depth map of the scene at the said higher spatial resolution level; and
wherein the disparity values of the global disparity map at the higher spatial resolution level are each estimated within a restricted disparity range determined based on disparity values of a global disparity map previously estimated for a corresponding set of stereo images and active depth map of the scene at a lower spatial resolution level.

2. The method according to claim 1, further comprising determining, at the lower spatial resolution level, a matching reliability parameter representative of the reliability of matching between the respective stereo images, wherein the matching reliability parameter acquired at the lower spatial resolution level is used in the cost function as a weighting factor of a matching error for the respective stereo images at the higher spatial resolution level.

3. The method according to claim 1, further comprising obtaining at the higher spatial resolution level an active reliability parameter representative of the reliability of the active depth estimation technique for a respective pixel of the active depth map at the higher spatial resolution level and wherein the active reliability parameter obtained at the higher resolution level is used in the cost function as a weighting factor of the determined consistency at the said higher spatial resolution level.

4. The method according to claim 1, wherein the disparity for the global disparity map is determined based on the minimization of the cost function $E_{global}^{k}(p,d)$, the cost function for a pixel p at a spatial resolution level k being based on the expression:

$$E_{global}^{k}(p,d)=R_{match}^{k-1}(p)E_{match}^{k}(p,d)+\lambda R_{sensor}^{k}(p)E_{sensor}^{k}(p,d) \text{ where}$$

$E_{match}^{k}$ is representative of matching error for the stereo images;
$R_{match}^{k-1}$ refers to the matching reliability calculated at a previous level of lower resolution k−1 for the corresponding stereo images;
$E_{sensor}^{k}$ is representative of the consistency between the estimated stereo disparity and the respective active depth map;
$R_{sensor}^{k}$ refers to the active reliability parameter representative of the reliability of the active depth estimation technique.

5. The method according to claim 4, wherein the consistency between the estimated stereo disparity and the respective active depth map at spatial resolution level k is based on the expression:

$$E_{sensor}^{k}(p,d)=(d-D_{sensor}^{k}(p))^2 \text{ where:}$$

$D_{sensor}^{k}(p)$ is the disparity computed at spatial resolution level k from the depth acquired at pixel p in the active depth map and d is the corresponding disparity estimated from the set of stereo images.

6. The method according to claim 1, further comprising at a given spatial resolution level determining a global reliability factor representative of the reliability of a fusion of the active depth map and the corresponding estimated stereo disparity at the given spatial resolution level.

7. The method according to claim 1, wherein the set of stereo images includes three stereo images.

8. The method according to claim 1, wherein providing the set of stereo images and the active depth map at each of a plurality of spatial resolution levels comprises obtaining a first set of stereo images at a first level of spatial resolution using a passive depth estimation technique and downsampling the first set of stereo images to provide at least a second set of stereo images at a second level of spatial resolution lower than the first level of spatial resolution, and obtaining a first active depth map at the first level of spatial resolution using an active depth estimation technique and downsampling the first active depth map to obtain at least a second active depth map at the second level of spatial resolution.

9. An image processing device for processing image data of a scene to provide depth information of the scene, the device comprising at least one processor configured to:
obtain, at each of a plurality of spatial resolution levels, a set of stereo images of the scene corresponding to a passive depth estimation technique, and an active depth map corresponding to an active depth estimation technique;
obtain, at a higher spatial resolution level of the stereo images and respective active depth map, a global disparity map according to a cost function, the cost function being based on an estimated stereo disparity between corresponding pixels of the respective set of stereo images at the said higher spatial resolution level and on a determined consistency between the estimated stereo disparity and the respective active depth map of the scene at the higher spatial resolution level; and
wherein the disparity values of the global disparity map at the higher spatial resolution level are each estimated within a restricted disparity range determined based on disparity values of a global disparity map previously estimated for a corresponding set of stereo images and active depth map of the scene at a lower spatial resolution level.

10. The device according to claim 9, wherein the processor is configured to determine, at the lower spatial resolution level, a matching reliability parameter representative of the reliability of matching between the respective stereo images, wherein the matching reliability parameter acquired at the lower spatial resolution level is used in the cost function as a weighting factor of a matching error for the respective stereo images at the higher spatial resolution level.

11. The device according to claim 9, wherein the processor is configured to obtain at the higher spatial resolution level an active reliability parameter representative of the reliability of the active depth estimation technique for a respective pixel of the active depth map at the higher spatial resolution level and wherein the active reliability parameter obtained at the higher spatial resolution level is used in the cost function as a weighting factor of the determined consistency at the said higher spatial resolution level.

12. The device according to claim 9, wherein the processor is configured to determine the disparity for the global disparity map based on the minimization of the cost function $E_{global}^k(p,d)$, the cost function for a pixel p at a spatial resolution k being expressed as $$E_{global}^k(p,d) = R_{match}^{k-1}(p) E_{match}^k(p,d) + \lambda R_{sensor}^k(p) E_{sensor}^k(p,d) \text{ where}$$

$E_{match}^k$ is representative of a matching error for the stereo images;

$R_{match}^k$ refers to the matching reliability calculated at a previous level of lower resolution k−1 for corresponding stereo images;

$E_{sensor}^k$ is representative of the consistency between the estimated stereo disparity and the respective active depth map;

$R_{sensor}^k$ refers to the active reliability parameter representative of the reliability of the active depth estimation technique.

13. The device according to claim 9, wherein the processor is configured to determine the consistency between the estimated stereo disparity and the respective active depth map according to the following expression:

$$E_{sensor}^k(p,d) = (d - D_{sensor}^k(p))^2 \text{ where:}$$

$D_{sensor}^k(p)$ is the disparity computed at resolution level k from the depth acquired at pixel p in the active depth map and d is the corresponding disparity estimated from the set of stereo images.

14. The device according to claim 9, wherein the processor is configured to, at a given spatial resolution level, determine a global reliability factor representative of the reliability of a fusion of the active depth map and the corresponding estimated stereo disparity at the given level of spatial resolution.

15. The device according to claim 9, wherein the set of stereo images includes three stereo images.

16. The device according to claim 9, comprising a plurality of passive range sensor cameras to obtain a first set of stereo images at a first level of spatial resolution and a down sampler to down sample the first set of stereo images to provide at least a second set of stereo images at a second level of spatial resolution lower than the first level of spatial resolution, and an active depth camera to obtain a first active depth map at the first level of spatial resolution the down sampler being configured to down sample the first active depth map to obtain at least a second active depth map at the second level of spatial resolution.

17. A computer program product stored on a non-transitory storage medium for execution by a programmable apparatus, the computer program product comprising a sequence of instructions for implementing the method according to claim 1.

18. A method for providing depth information of a scene, the method comprising:

obtaining, from a set of stereo images of the scene, provided in a passive depth estimation technique, and a respective active depth map of the scene, provided in an active depth estimation technique, a global disparity map according to a cost function, the cost function being based on an estimated stereo disparity between corresponding pixels of the respective set of stereo images and on a determined consistency between the estimated stereo disparity and the respective active depth map of the scene; the set of stereo images and the respective active depth map being of a first spatial resolution level; wherein the disparity values of the global disparity map at the first spatial resolution level are estimated within a restricted disparity range determined based on corresponding disparity values of a global disparity map obtained for a respective set of stereo images and active depth map of the said scene at a second spatial resolution level, the second spatial resolution level being lower than the first spatial resolution level.

19. The method according to claim 18, further comprising determining, at the second spatial resolution level, a matching reliability parameter representative of the reliability of matching between the respective stereo images, wherein the matching reliability parameter acquired at the second spatial resolution level is used in the cost function as a weighting factor of a matching error for the respective stereo images at the first spatial resolution level.

20. An image processing device for processing image data of a scene to provide depth information of the scene, the device comprising at least one processor configured to: obtain, from a set of stereo images of the scene, provided in a passive depth estimation technique, and a respective active depth map of the scene, provided in an active depth estimation technique, a global disparity map according to a cost function, the cost function being based on an estimated stereo disparity between corresponding pixels of the respective set of stereo images and on a determined consistency between the estimated stereo disparity and the respective active depth map of the scene; the set of stereo images and the respective active depth map being of a first spatial resolution level; wherein the disparity values of the global disparity map at the first spatial resolution level are estimated within a restricted disparity range determined based on corresponding disparity values of a global disparity map obtained for a respective set of stereo images and active depth map of the said scene at a second spatial resolution level, said second spatial resolution level being lower than the first spatial resolution level.

21. The device according to claim 20, wherein the at least one processor is configured to determine, at the second spatial resolution level, a matching reliability parameter representative of the reliability of matching between the respective stereo images, wherein the matching reliability parameter acquired at the second spatial resolution level is used in the cost function as a weighting factor of a matching error for the respective stereo images at the first spatial resolution level.

* * * * *